US006760656B2

(12) United States Patent
Matthews et al.

(10) Patent No.: US 6,760,656 B2
(45) Date of Patent: Jul. 6, 2004

(54) AIRFLOW ESTIMATION FOR ENGINES WITH DISPLACEMENT ON DEMAND

(75) Inventors: Gregory Paul Matthews, West Bloomfield, MI (US); Charles Henry Folkerts, Troy, MI (US)

(73) Assignee: General Motors Corporation, Detroit, MI (US)

( * ) Notice: Subject to any disclaimer, the term of this patent is extended or adjusted under 35 U.S.C. 154(b) by 29 days.

(21) Appl. No.: 10/150,900

(22) Filed: May 17, 2002

(65) Prior Publication Data

US 2003/0220732 A1 Nov. 27, 2003

(51) Int. Cl.[7] ................................................ G06F 19/00

(52) U.S. Cl. ....................... 701/101; 123/480; 123/481; 701/102; 701/103

(58) Field of Search ................................. 701/101, 103, 701/104, 114, 115; 123/391, 480, 481, 488, 402, 403

(56) References Cited

U.S. PATENT DOCUMENTS

| | | | | | |
|---|---|---|---|---|---|
| 5,270,935 | A | | 12/1993 | Dudek et al. | |
| 5,423,208 | A | | 6/1995 | Dudek et al. | |
| 5,465,617 | A | | 11/1995 | Dudek et al. | |
| 5,781,700 | A | * | 7/1998 | Puskorius et al. | 706/14 |
| 6,349,293 | B1 | * | 2/2002 | Yamaguchi | 706/2 |
| 6,349,700 | B1 | * | 2/2002 | Buckland et al. | 123/352 |
| 6,363,316 | B1 | * | 3/2002 | Soliman et al. | 701/104 |
| 6,405,122 | B1 | * | 6/2002 | Yamaguchi | 701/106 |

* cited by examiner

*Primary Examiner*—John Kwon
(74) *Attorney, Agent, or Firm*—Christopher DeVries

(57) ABSTRACT

A control method and system according to the present invention for a displacement on demand engine estimates cylinder air charge and/or predicts cylinder air charge for future cylinder interrupts. A model is provided that estimates cylinder air charge and/or predicts cylinder air charge for future cylinder interrupts. The model includes a history vector of inputs and states. The history vector of inputs and states are updated when a cylinder firing interrupt occurs. An operating mode of the engine is determined. Based on the operating mode, model parameters and model inputs are selected. The cylinder air charge is estimated and predicted for future cylinder interrupts.

36 Claims, 9 Drawing Sheets

AIRFLOW ESTIMATION FOR ENGINES WITH DISPLACEMENT ON DEMAND

FIELD OF THE INVENTION

The present invention relates to control systems for an internal combustion engine, and more particularly to an airflow estimator for internal combustion engines with displacement on demand.

BACKGROUND OF THE INVENTION

"Air-lead" control systems for internal combustion engines estimate an inlet airflow rate of the engine to control the air/fuel ratio. If fuel is controlled to the individual cylinders, such as through conventional port fuel injection, the airflow rate for each of the cylinders is also estimated. The fuel flow rate delivered by the fuel injectors is adjusted based on the estimated airflow to provide the desired air/fuel ratio, such as a stoichiometric air/fuel ratio.

When operating at the stoichiometric air/fuel ratio, the catalytic converter more efficiently reduces undesirable exhaust gas constituents. Minor deviations from the stoichiometric air/fuel ratio significantly degrade the efficiency of the catalytic converter, which increases emissions.

The precision of air-lead control systems is limited by the accuracy of the inlet airflow rate estimates. When engine inlet air dynamics are in steady state, a conventional mass airflow meter that is located in the engine inlet airflow path provides an accurate estimate. Steady state operation occurs when the air pressure in the engine intake manifold is substantially constant over a sufficient time period. When significant manifold filling or depletion are absent, the mass airflow meter accurately estimates cylinder inlet airflow rate.

The mass airflow meter does not accurately characterize cylinder inlet airflow rate under transient conditions due to significant time constants that are associated with manifold filling, manifold depletion, and/or mass airflow meter lag. Transient conditions can arise in a variety of circumstances during engine operation. For example, transient conditions arise when displacement on demand engines increase or decrease the number of operating cylinders. In addition, substantial changes in engine inlet throttle position (TPOS) or other conditions that perturb engine manifold absolute pressure (MAP) also create transient conditions. Transient conditions inject errors in the mass airflow meter estimate. In addition to increasing emissions, the failure to achieve a stoichiometric air/fuel ratio adversely impacts vehicle drivability and torque output.

Airflow estimation systems developed by the assignee of the present invention are disclosed in U.S. Pat. Nos. 5,270,935, 5,423,208, and 5,465,617, which are hereby incorporated by reference. The airflow estimation systems disclosed in these patents do not adequately estimate inlet airflow for displacement on demand engines such as cylinder deactivation engines. These airflow estimation systems do not correctly estimate the cylinder inlet airflow when the engine is running on less than all of the cylinders. In addition, these airflow estimation systems do not accurately estimate airflow during cylinder activation and deactivation transitions.

SUMMARY OF THE INVENTION

An airflow estimation method and apparatus according to the present invention for a displacement on demand engine estimates cylinder air charge. A model is provided that estimates cylinder air charge. The model includes a history vector of inputs and states that are updated when a cylinder firing interrupt occurs. An operating mode of the engine is determined. Based on the operating mode, model parameters and model inputs are selected. The cylinder air charge is estimated.

In other features of the invention, the model is capable of predicting cylinder air charge for future cylinder firing interrupts. The operating mode of the engine includes half and full cylinder modes. The model inputs for the half cylinder mode are taken over a crank angle period twice as long as the full cylinder mode. The estimating step is performed during the half cylinder mode only when an active cylinder firing interrupt occurs.

In yet other features, when switching from full cylinder mode to half cylinder mode, blending of half and full cylinder model inputs is performed for a first calibrated time. When switching from half cylinder mode to full cylinder mode, blending of half and full cylinder model inputs is performed for a second calibrated time.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
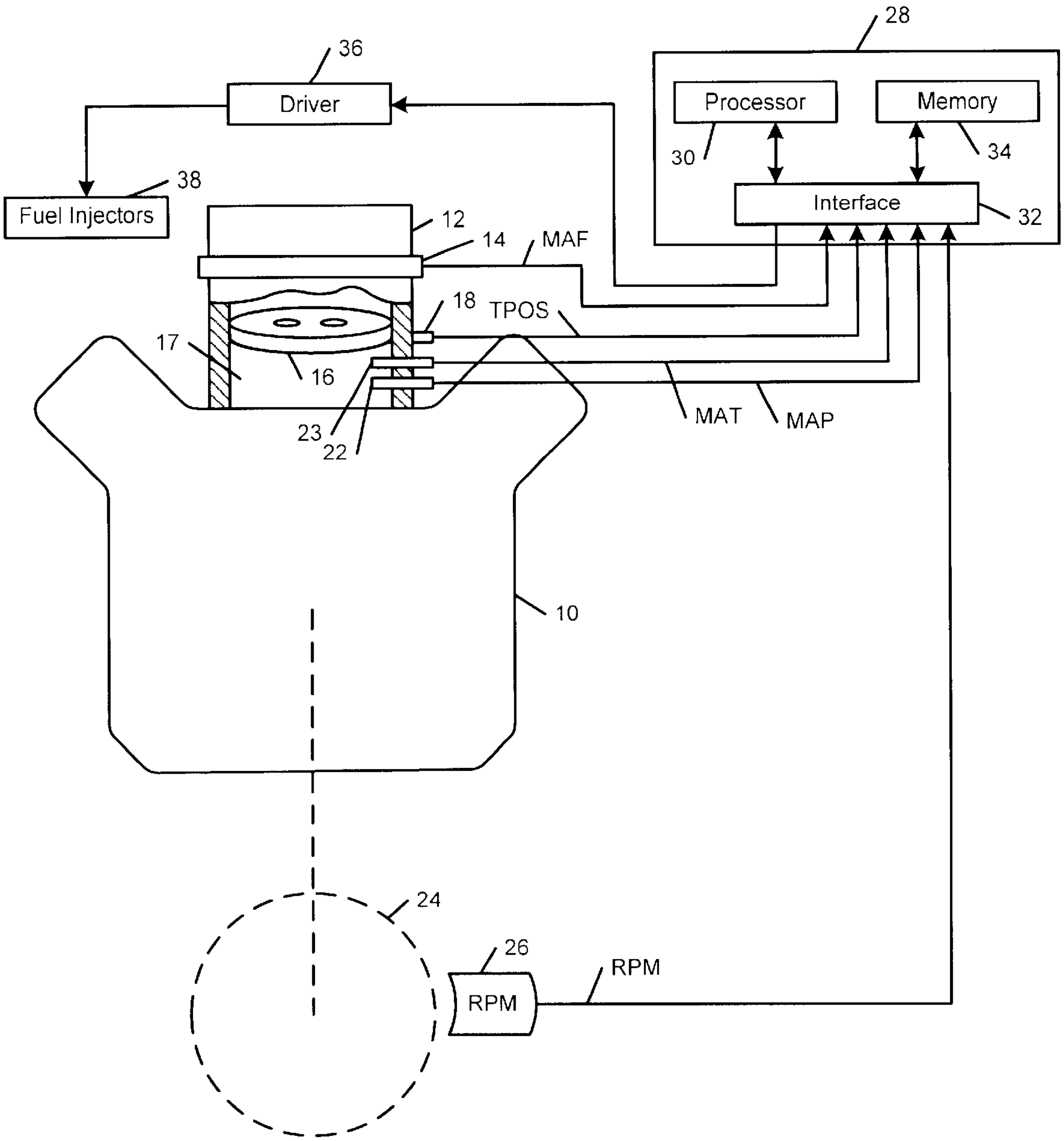
FIG. 1 illustrates a displacement on demand engine and an air estimation system according to the invention.

The following description of the preferred embodiment(s) is merely exemplary in nature and is in no way intended to limit the invention, its application, or uses. For purposes of clarity, the same reference numbers will be used in the drawings to identify similar elements. As used herein, the term cylinder air charge will be employed. Cylinder inlet airflow can be derived from cylinder air charge or mass of air trapped in the cylinder. In addition, the terms cylinder air charge or cylinder inlet airflow will be used interchangeably with air per cylinder (APC).

Referring to FIG. 1, air is provided to an internal combustion engine 10 through an inlet 12. Preferably, the engine 10 is a displacement on demand engine. Air is passed from the inlet 12 through a mass airflow sensor 14, such as a conventional mass airflow meter. The sensor 14 generates a mass airflow (MAF) signal that indicates the rate of air flowing through the sensor 14. The inlet air is metered to the engine 10 via a throttle valve 16. The throttle valve 16 may be a conventional butterfly valve that rotates within an inlet air path 17. The throttle valve 16 is moved based on an operator or controller commanded engine operating point. The rotational position of the throttle valve 16 is sensed by a throttle position sensor 18 that generates a throttle position signal (TPOS) based on the rotational position of the valve 16. The throttle position sensor 18 may be a rotational potentiometer.

A manifold pressure sensor 22 is located in the inlet air path 17. The manifold pressure sensor 22 is preferably positioned in an engine intake manifold between the throttle valve 16 and the engine 10. The manifold pressure sensor 22 generates a manifold absolute air pressure (MAP) signal. A manifold air temperature (MAT) sensor 23 is located in the inlet air path 17 and generates a MAT signal. The MAT sensor 23 can also be located in the engine intake manifold to sense air temperature therein and to generate the MAT signal.

An engine output shaft 24, such as an engine crankshaft, rotates at engine speed or a rate that is proportional to engine speed. Teeth (not shown) are typically spaced about a circumferential outer portion of the shaft 24. A sensor 26, such as a conventional variable reluctance sensor, senses the teeth on the sensor. The teeth may be spaced about the circumference of the shaft 24 such that the passage of a tooth by the sensor 26 corresponds to an engine cylinder event. Skilled artisans will appreciate that there are other suitable methods of sensing engine speed and cylinder events.

An engine controller 28 includes a processor 30, an input/output (I/O) interface 32, and memory 34 such as read only memory (ROM), random access memory (RAM), flash memory or other suitable electronic storage. The controller 28 receives input signals including the MAF, TPOS, MAP, MAT and RPM signals and generates engine control commands as will be described more fully below.

The input signals are used to estimate engine inlet airflow rate that is used to predict cylinder inlet airflow rate. The estimate is also used to determine cylinder fuel requirements to achieve a desired engine air/fuel ratio (such as the stoichiometric ratio). For example, the estimates can be used to determine a duty cycle for opening the fuel injectors to deliver a precise amount of fuel to active engine cylinders. One or more fuel injector drivers 36 may be used to transform the duty cycle signal into a command that is suitable to open and close an appropriate fuel injector 38.

The crank angle sampling period when the engine runs on half of the cylinders is twice the sampling period when the engine runs on all of the cylinders. For example for 8 cylinder engines, the crank angle (CA) sampling period is 90 CA° when the engine runs on 8 cylinders. The crank angle sampling period is 180 CA° when the engine runs on 4 cylinders. The airflow estimation systems set forth in U.S. Pat. Nos. 5,270,935, 5,423,208, and 5,465,617 rely on the crank angle sampling period to calculate the cylinder intake airflow and to reference engine information from the past three events.

The present invention adjusts the crank angle sampling period after cylinder activation and deactivation transitions occur. The present invention also handles events that are referenced by the airflow estimation systems set forth in U.S. Pat. Nos. 5,270,935, 5,423,208, and 5,465,617 during these transitions. As a result, the proper variables and parameters are loaded into the air estimation system under steady state and transition operating modes.

For engines with cylinder deactivation, there is a significant change in the breathing of the engine during the transitions when the cylinders are deactivated and reactivated. When the transitions occur, there is a change in the air behavior due to the change in the time (or crank angle degrees) between the cylinder intake events. Existing methods for estimating the cylinder inlet airflow are modified to account for these changes.

The air estimation system according to the present invention can be implemented by time-based or cylinder event-based models. The present invention may be implemented by using state estimators, differential equations, integral equations, lookup tables, or other similar calculations.

Regardless of the method that is employed, the air charge calculations are reset at the activation and/or deactivation transitions of the engine. The transfer of air around the throttle and through the manifold to the cylinders changes significantly for an engine operating with all of the cylinders as compared to operation with half of the cylinders. Changes should also be made to accurately estimate the mass of air to be trapped in the cylinder that will take in its charge during the intake stroke for intake events in the future.

One or more of the following changes are required: A sufficient number of prior samples and variables are saved to perform calculations for the slowest air dynamic behavior. The rate at which the inputs and variables are used in the calculations is adjusted. Initial conditions for the inputs and variables are re-initialized. The coefficients in the cylinder air prediction algorithm are changed.

The amount of prior data required to perform the calculations depends upon the engine operating mode. During half cylinder operation, the current cylinder being charged is affected by cylinders that had their intake strokes further back in time than when the engine is operating in a full cylinder mode. Therefore, the history of the inputs and state variables are stored for a longer period during the half cylinder mode Resetting the calculations at the transitions requires the storage of additional values so that the information is readily available for any expected operating mode.

The airflow estimation system according to the present invention samples data at the full cylinder rate and utilizes data at one half of the rate of full cylinder operation for twice the period of full cylinder operation. The sampled data is stored in a history vector. Depending upon the mode of operation, the airflow estimation system selects the appropriate data from the history vector.

When a transition occurs between the operating modes, the calculation is reset. The calculation is preferably reset by reinitializing initial conditions of the inputs and state variables that are used in the calculation. The correct inputs are selected from the history vector when the first cylinder is deactivated or reactivated during the transition. Preferably, the equations remain the same and the values of the parameters are changed.

The air estimation system estimates airflow for an engine with half and full cylinder operating modes. The system monitors the cylinder firing events for the full cylinder operating mode. When operating in the half cylinder mode, the system operates at the same rate. Inputs required for the calculation are sampled and the history vector is updated. The oldest values are moved out of the history vector. The remaining values are moved one location in the history vector. New samples are stored in the history vector as the most current sample. Once the history vector is updated, the system proceeds based on whether the firing mode is half or full.

In the full cylinder operating mode, parameters for the full cylinder operating mode are selected. Full cylinder mode inputs are selected from the history vector. The coefficients and inputs are used to perform the air prediction and estimation calculations. The calculated values are used to control the air/fuel ratio.

In the half cylinder mode, the system determines whether a current firing event is synchronous with a half cylinder firing mode. If not, the system does not update the airflow predictions and estimates. If the firing event is an event that is synchronous with the half cylinder firing mode, the half cylinder model parameters are selected. The half cylinder mode inputs are selected from the history vector. The coefficients and inputs are used to perform the airflow prediction and estimation calculations. The calculated values are used to control the air/fuel ratio.

Figure 2:
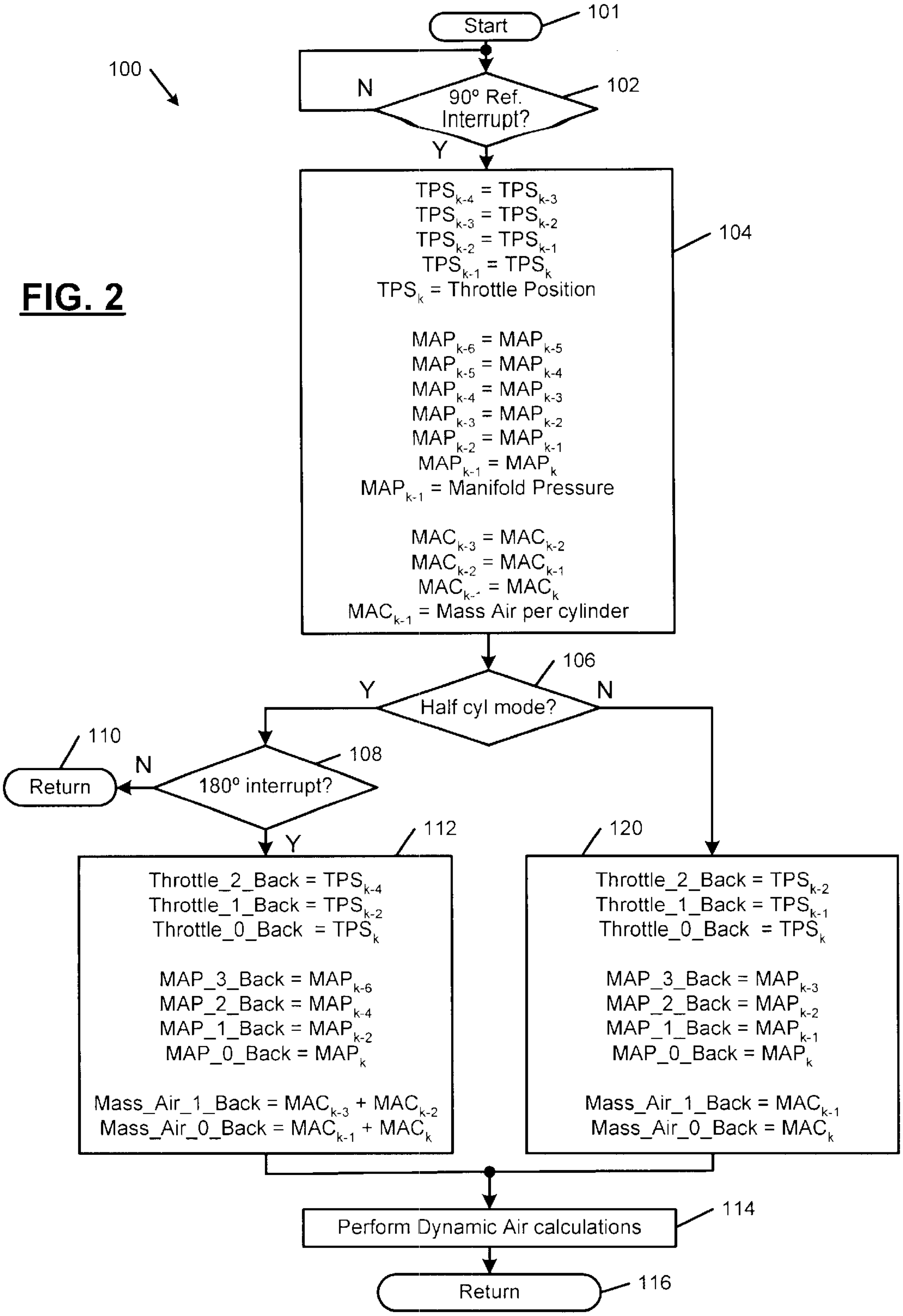
FIG. 2 is a flowchart illustrating steps for estimating cylinder intake airflow.

Referring now to FIG. 2, an air prediction method 100 that is performed by the air estimation system is illustrated. The method employs a generic functional calculation involving function f( . . . ) and/or g( . . . ) that processes the model coefficients, the input parameters, and the past prediction values. Control begins in step 101. In step 102, the controller 28 determines whether a 90° cylinder firing event has occurred. If not, control loops back to step 102. The history vector is updated in step 104 with new samples. In step 106, the controller 28 determines whether the engine 10 is operating in a half cylinder mode. If it is, control continues with step 108 where the controller 28 determines whether a 180° cylinder firing event has occurred. If not, control returns in step 110. Otherwise, the controller 28 retrieves the appropriate TPS, MAP and MAC values from the history vector and sets parameters for the half cylinder mode in step 112. In step 114, the controller 28 performs dynamic air calculations, for example using the calculations described in the referenced patents. In step 116, control returns.

If the controller 28 determines that the engine 10 is not operating in the half cylinder mode in step 106, control continues with step 120. In step 120, the controller 28 retrieves the appropriate TPS, MAP and MAC values from the history vector and sets parameters for the full cylinder mode. Control continues from step 120 to step 114.

Figure 3:
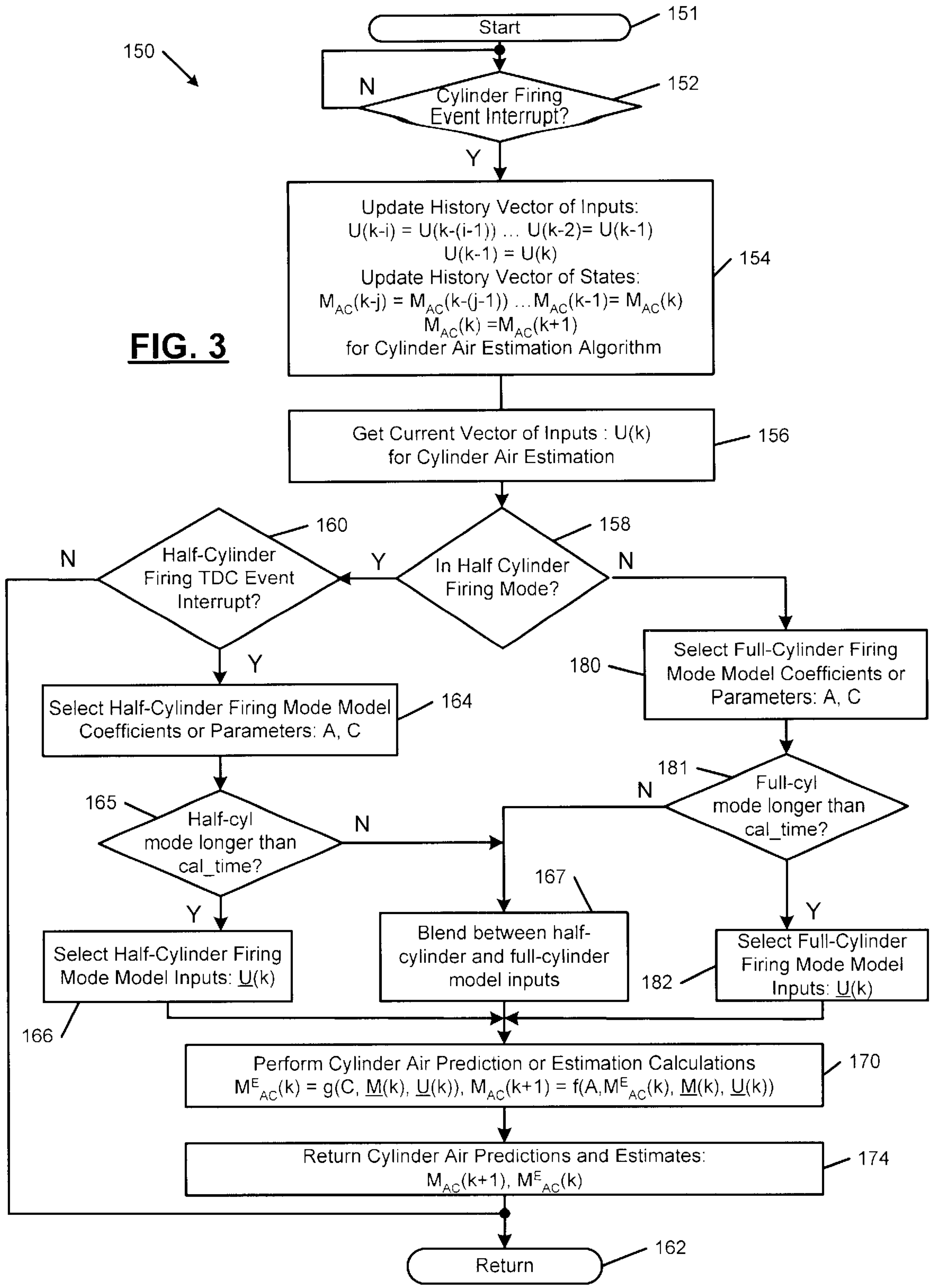
FIG. 3 is a flowchart illustrating steps for estimating cylinder intake airflow using an event-based model.

Referring now to FIG. 3, an event based air estimation method 150 is shown. Control begins with step 151. In step 152, the controller 28 determines whether a cylinder firing event interrupt has occurred. Cylinder firing interrupts occur once per cylinder firing at a fixed crank angle location relative to top dead center of the intake stroke. The number of interrupts per revolution is equal to (maximum number of cylinders)/2. If the cylinder firing event has not occurred, control loops back to step 152. Otherwise, the controller 28 updates the history vector of inputs and the history vector of states. In step 156, the controller 28 retrieves the current vector inputs. The purpose of the logic in steps 154 and 156 is to reset the state variables and inputs of the mathematical models at the transitions between the full and half firing modes. As a result, the calculation of the mass of air in the cylinder makes a smooth transition.

In step 158, the controller 28 determines whether the engine 10 is operating in a half cylinder mode. If it is, control continues with step 160 where the controller 28 determines whether a half cylinder firing top dead center (TDC) event interrupt has occurred. If not, control continues with step 162. Otherwise, control continues with step 164 where the controller 28 selects the half cylinder firing mode parameters. In step 165, the controller determines whether the half-cylinder mode is longer than a calibration time. If true, the controller 28 selects half cylinder firing mode model inputs in step 166. If false, the controller blends half and full cylinder model inputs in step 167. In step 170, the controller 28 performs cylinder air prediction and estimation calculations. In step 174, the controller 28 returns cylinder air predictions and estimates. In step 162, control returns.

If the engine is not operating in the half cylinder mode as determined in step 158, control continues with step 180 where the controller 28 selects full cylinder firing mode parameters. In step 181, the controller determines whether the full-cylinder mode is longer than a calibration time. If true, the controller 28 selects full cylinder firing mode model inputs in step 182. If false, the controller continues with step 167. Control continues from step 182 to step 170.

In FIG. 3, $M_{AC}(k)$ is the mass of air trapped in the cylinder for the cylinder whose intake stroke is at bottom dead center (BDC). $M_{AC}(k+1)$ is the mass of air trapped in the cylinder for the next cylinder whose intake stroke will be at BDC. $M^{E}_{AC}(k)$ is an estimate of the mass of air trapped in the cylinder. f( . . . ) is a mathematical model for predicting the mass of air in the cylinder at the next cylinder intake stroke event in the future. g( . . . ) is a mathematical model for predicting the mass of air in the cylinder whose intake stroke has just ended. Parameter A is a set of model parameters that the mathematical model f( . . . ) uses to characterize a specific engine. Parameter C is a set of model parameters that the mathematical model g( . . . ) uses to characterize a specific engine.

U(k) is a set of input variables or vector that the mathematical model uses to predict or to estimate the mass of air in the cylinder. $\underline{U}(k)$ is a history vector of inputs at the current intake event that the mathematical model uses to predict or to estimate the mass of air in the cylinder. $\underline{M}(k)$ is a history vector of states at the current intake event that the mathematical model uses to predict or to estimate the mass of air in the cylinder. k is the current cylinder intake event. k+1 is the next cylinder intake event. i is a length of the history vector of prior inputs that are required to estimate the mass of air in the cylinder at the current and next cylinder intake event. j is a length of the history vector of prior states required to estimate the mass of air in the cylinder at the current and next cylinder intake events.

Figure 4:
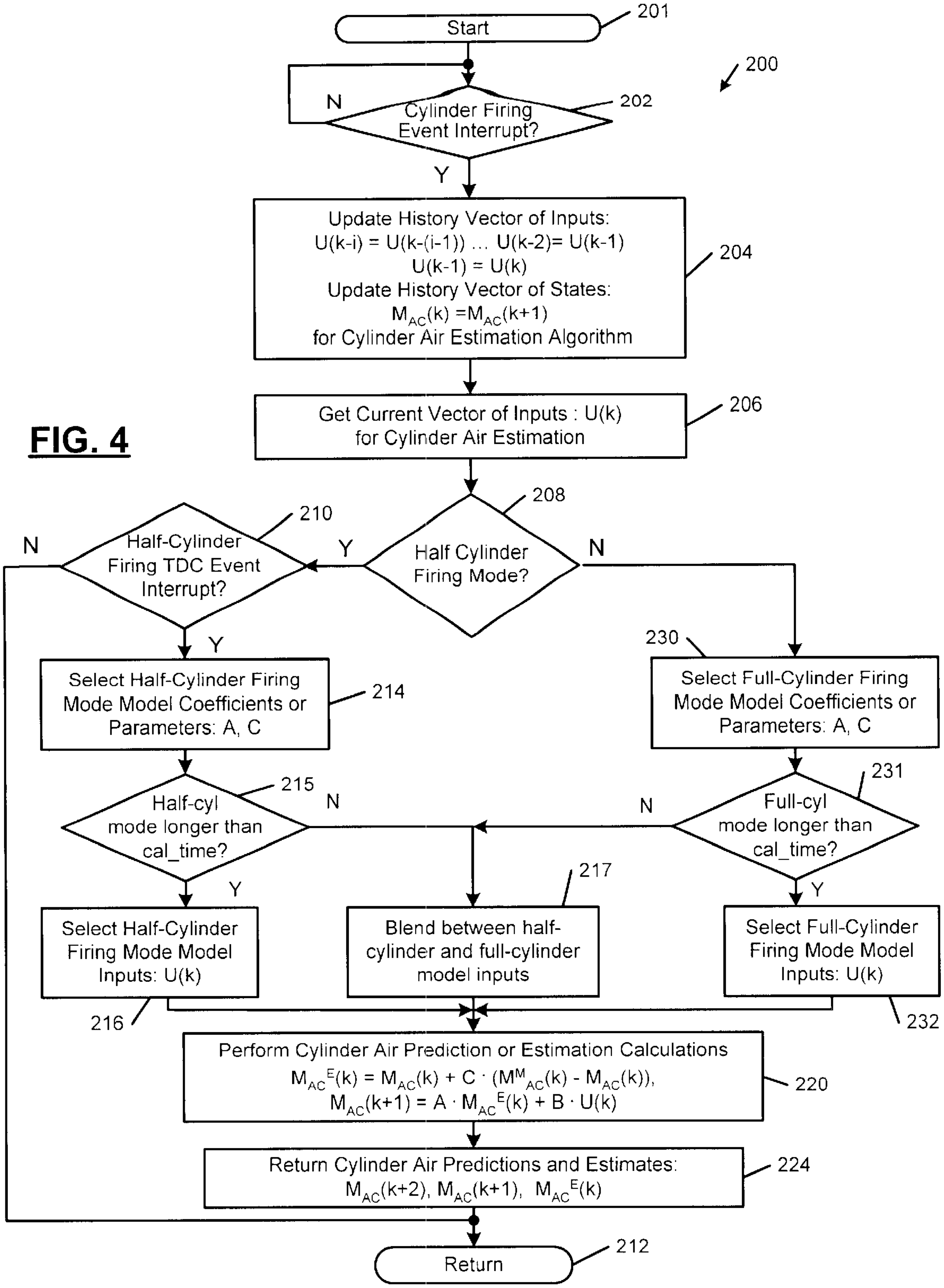
FIG. 4 is a flowchart illustrating steps for estimating cylinder intake airflow using an event-based linear model.

Referring now to FIG. 4, an event-based linear air estimation method 200 is shown. Control begins with step 202 where the controller 28 determines whether a cylinder firing event interrupt has occurred. If not, control loops back to step 202. Otherwise, the controller 28 updates history vector of inputs and history vector states in step 204. In step 206, the controller 28 retrieves current vector inputs. The purpose of the logic in steps 204 and 206 is to reset the state variables and inputs to the mathematical models at the transitions between the full and half firing modes. As a result, the calculation of the mass of air in the cylinder makes a smooth transition.

In step 208, the controller 28 determines whether the engine 10 is operating in a half cylinder mode. If it is, control continues with step 210 where the controller 28 determines whether a half cylinder firing TDC event interrupt has occurred. If not, control continues with step 212. Otherwise, control continues with step 214 where the controller 28 selects half cylinder firing mode model parameters. In step 215, the controller determines whether the half-cylinder mode is longer than a calibration time. If true, the controller 28 selects half cylinder firing mode model inputs in step 216. If false, the controller blends half and full cylinder model inputs in step 217. In step 220, the controller 28 performs cylinder air estimation and prediction calculations. In step 224, the controller 28 returns cylinder air estimates and predictions. In step 212, control returns.

If the engine is not operating in the half cylinder mode as determined in step 208, control continues with step 230. In step 230, the controller 28 selects full cylinder firing mode model parameters. In step 231, the controller determines whether the full cylinder mode is longer than a calibration time. If true, the controller 28 selects full cylinder firing mode model inputs in step 232. Control continues from step 232 to step 220. If false, the controller continues with step 217 where inputs are blended between half and full cylinder values. Control continues from step 217 to step 220.

In FIG. 4, $M_{AC}(k)$, $M_{AC}(k+1)$, and $M^{E}_{AC}(k)$ are the same variable in FIG. 3 as defined above. $M_{AC}(k+2)$ is the mass of air trapped in the cylinder for the next cylinder whose intake stroke will be at bottom dead center (BDC) two cylinder firings into the future. $M^{M}_{AC}(k)$ is an estimate or measurement of the mass of air trapped in the cylinder that is currently at BDC. Parameters A, B and C are a set of model parameters that the mathematical model uses to characterize a specific engine. U(k), $\underline{U}(k)$, k, k+1, i and j are them same as variables described above in FIG. 3.

Figure 5A:
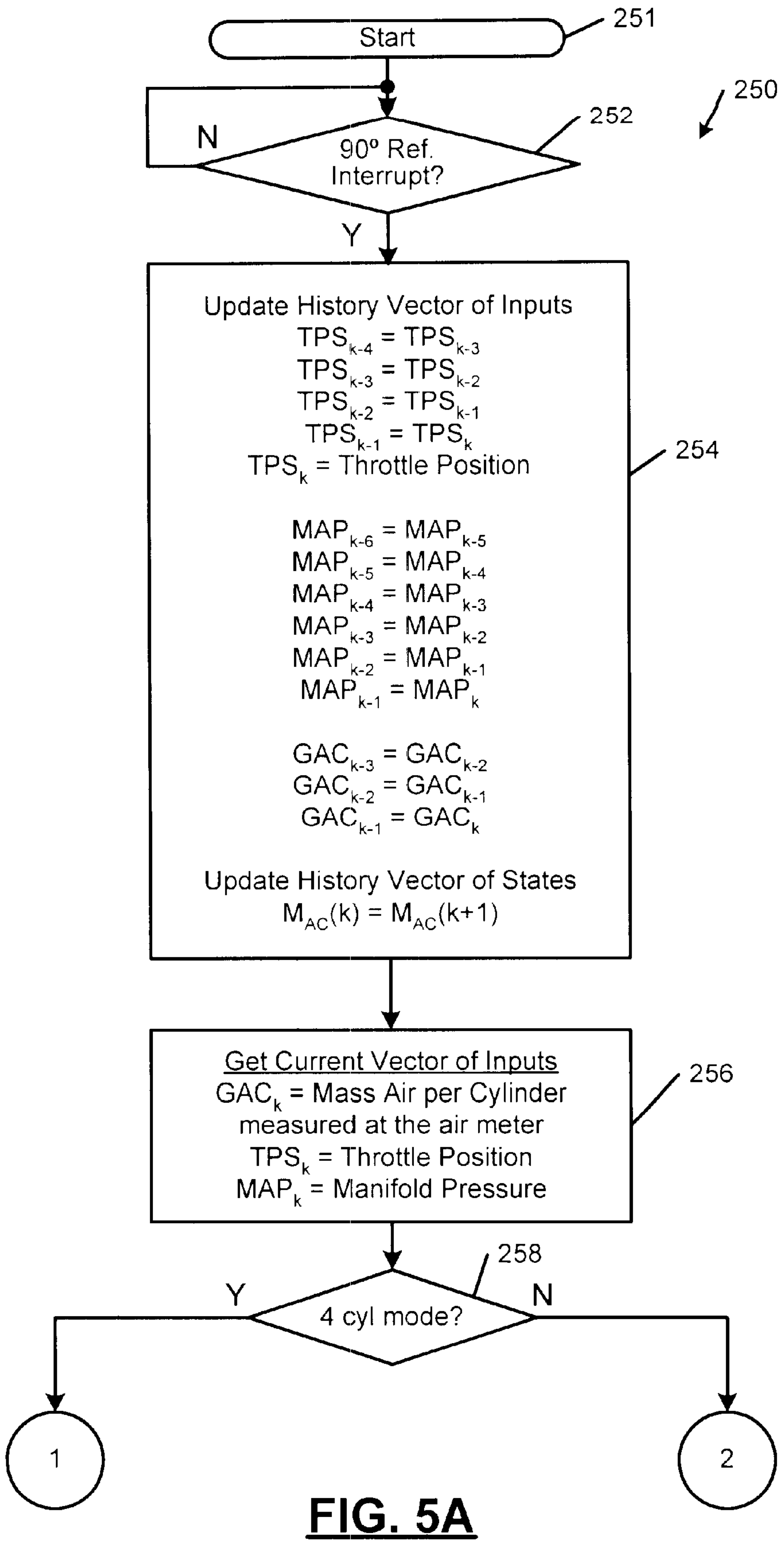
FIGS. 5A, 5B, and 5C are flowcharts illustrating steps for estimating air intake using a specific event-based model for an 8-cylinder engine.
Figure 5B:
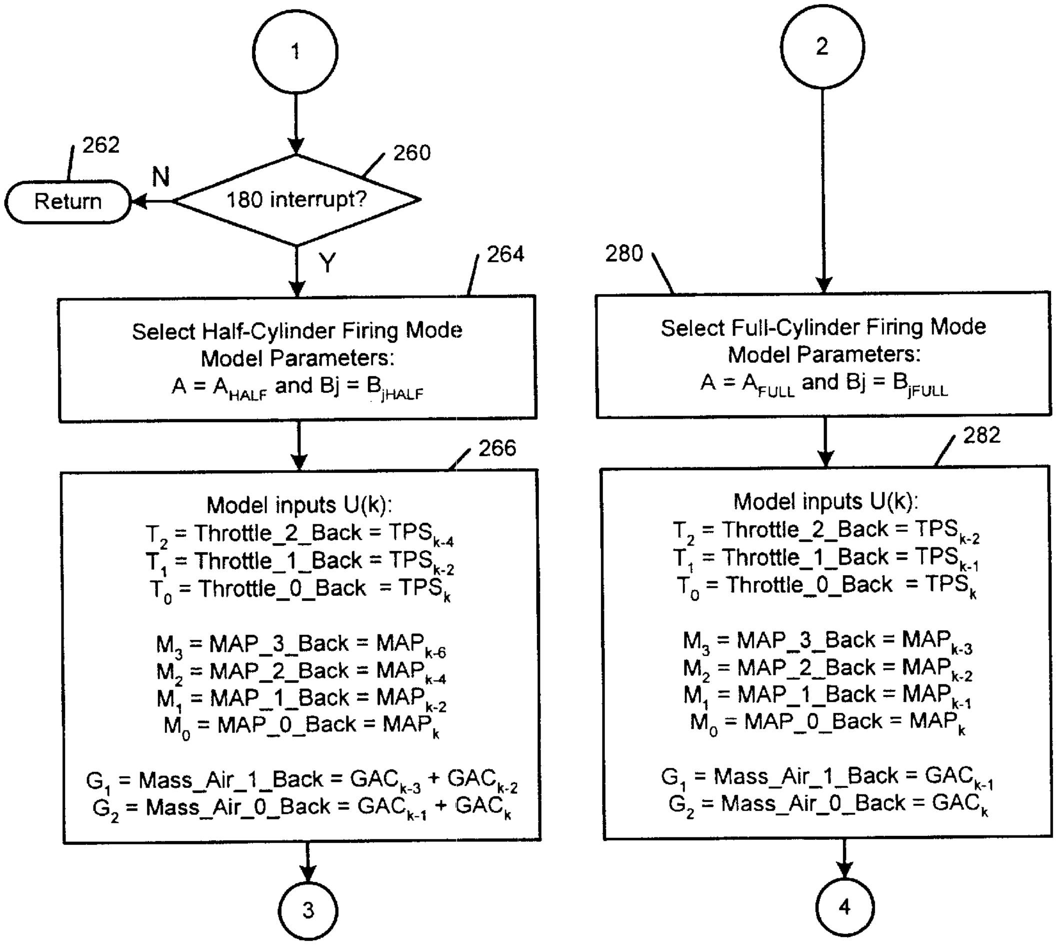
Figure 5C:
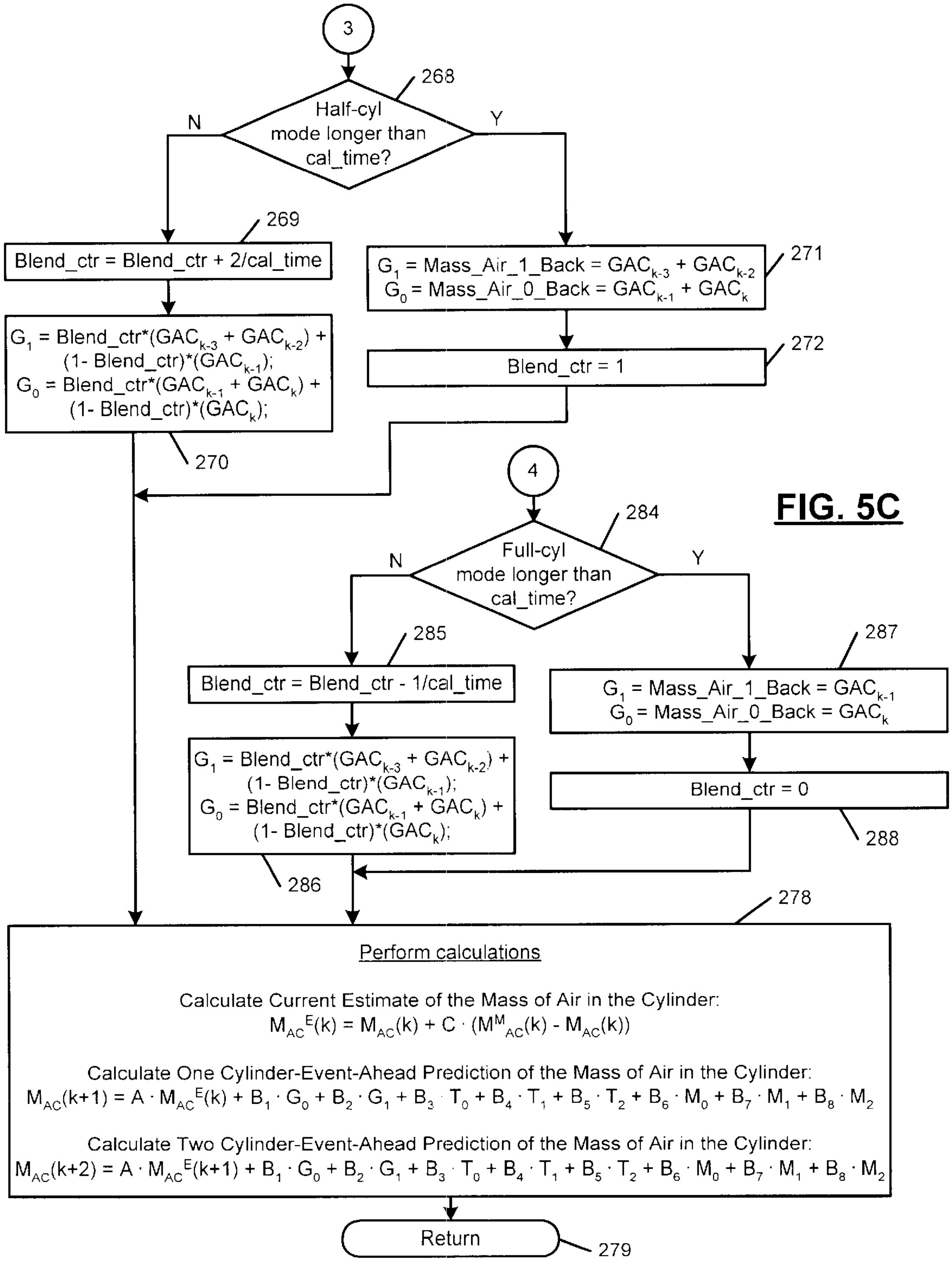

Referring now to FIGS. 5A, 5B and 5C, a specific event-based linear air estimation method 250 for an 8 cylinder engine is shown. Control begins with step 251. In step 252 the controller 28 determines whether a cylinder firing event interrupt has occurred. If not, control loops back to step 252. Otherwise, the controller 28 updates history vectors of inputs and states in step 254. In step 256, the controller 28 retrieves current vector inputs. The purpose of the logic in steps 254 and 256 is to reset the state variables and inputs to the mathematical models at the transitions between the full and half firing modes. As a result, the calculation of the mass of air in the cylinder makes a smooth transition.

In step 258, the controller 28 determines whether the engine 10 is operating in a 4 cylinder firing mode. If it is, control continues with step 260. In step 260, the controller 28 determines whether a 180° interrupt has occurred. If not, control continues with step 262. Otherwise, control continues with step 264 where the controller 28 selects half cylinder firing mode model parameters. In step 266, the controller 28 selects half cylinder firing mode model inputs.

In step 268, the controller determines whether the half-cylinder mode is longer than a calibration time. If false, the controller sets a blend counter equal to blend counter +2/(calibration time) in step 269. In step 270, the controller calculates $G_1$ and $G_0$ as shown. If true, the controller calculates $G_1$ and $G_0$ as shown in step 271 and sets the blend counter equal to 1 in step 272.

In step 278, the controller 28 performs cylinder air prediction and estimation calculations including calculating current estimates of the mass of air in the cylinder and one and two cylinder-event-ahead predictions of the mass of air in the cylinder. In step 279, control returns.

If the engine is not operating in a 4 cylinder firing mode as determined in step 258, control continues with step 280. In step 280, the controller 28 selects full cylinder firing mode model parameters. In step 282, the controller 28 selects full cylinder firing mode model inputs. In step 284, the controller determines whether the full-cylinder mode is longer than a calibration time. If false, the controller sets a blend counter equal to blend counter −1/(calibration time) in step 285. In step 286, the controller calculates $G_1$ and $G_0$ as shown. If true, the controller calculates $G_1$ and $G_0$ as shown in step 287 and sets the blend counter equal to 0 in step 288. Control continues from step 288 to step 278.

Figure 6A:
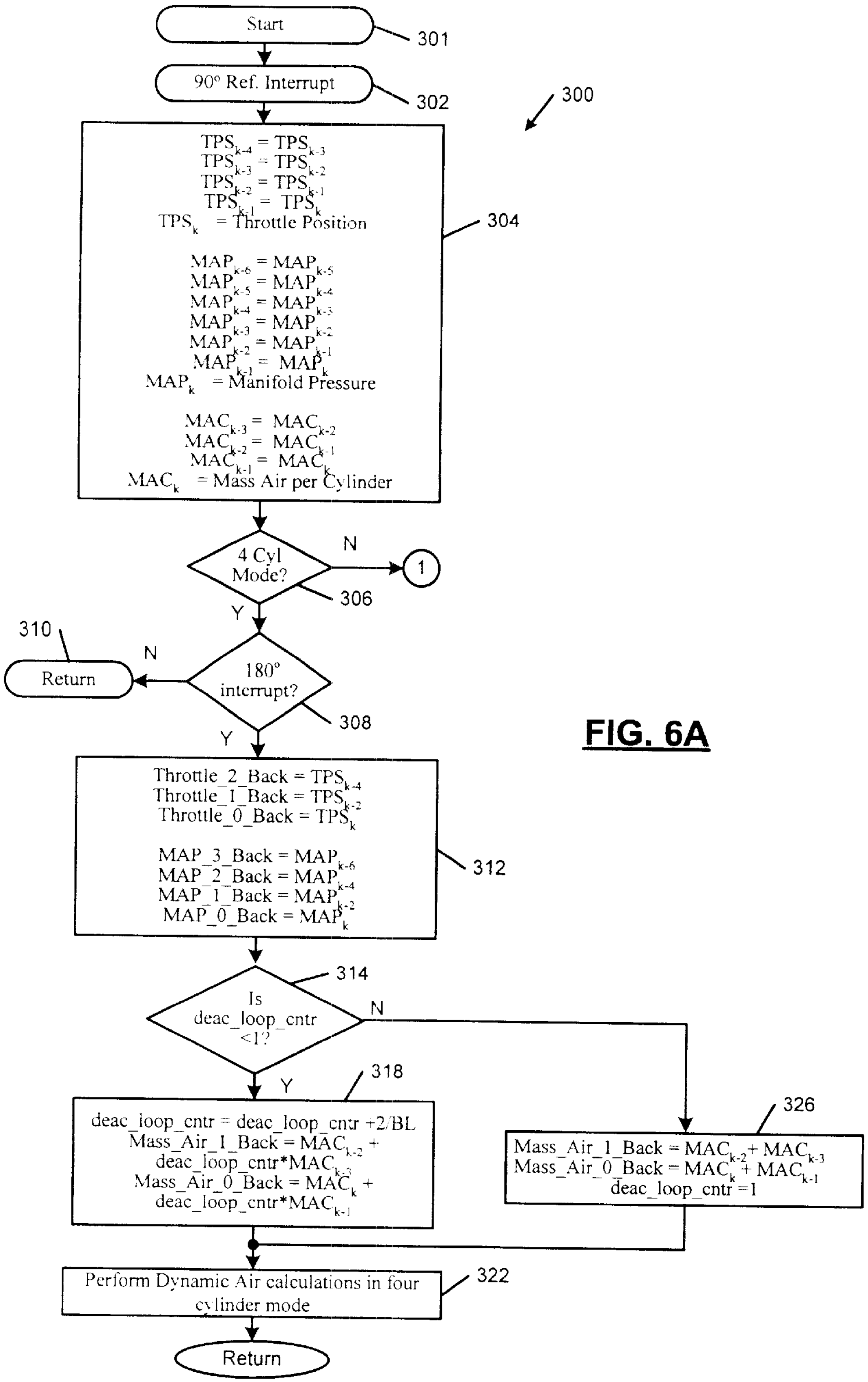
FIGS. 6A and 6B are flowcharts illustrating steps for estimating cylinder intake airflow.
Figure 6B:
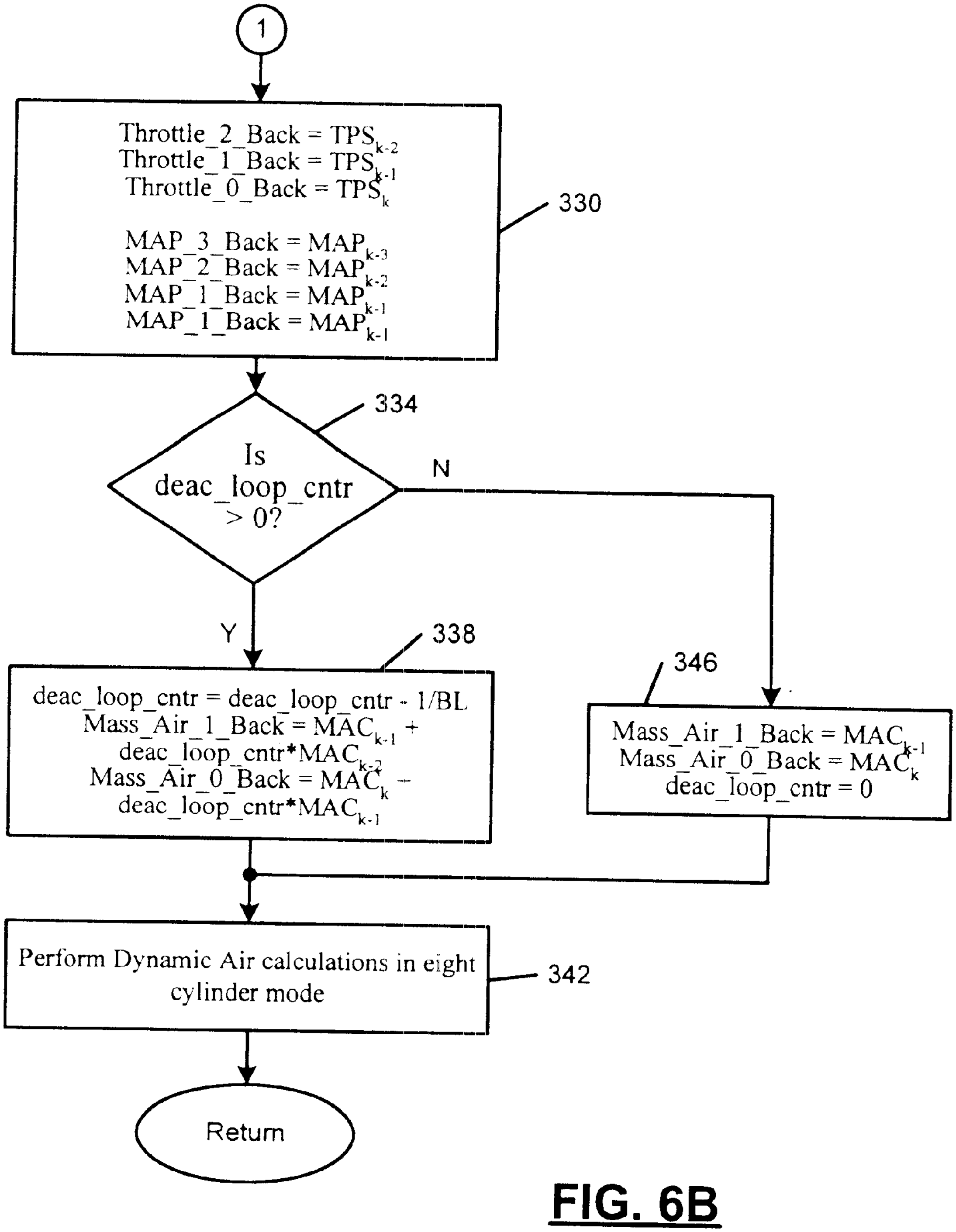

Referring now to FIGS. 6A and 6B, an air prediction method 300 that is performed by the air estimation system is illustrated. The method is a modification to the method illustrated in FIG. 2. The method employs a generic functional calculation involving function f( . . . ) and/or g( . . . ) that processes the model coefficients, the input parameters, and the past prediction values. Control begins in step 301. In step 302, the controller 28 determines whether a 90° cylinder firing event has occurred. If not, control loops back to step 302. The history vector is updated in step 304 with new samples.

In step 306, the controller 28 determines whether the engine 10 is operating in a four cylinder mode. If it is, control continues with step 308 where the controller 28 determines whether a 180° cylinder firing event has occurred. If not, control returns in step 310. Otherwise, the controller 28 retrieves the appropriate TPS and MAP values from the history vector and sets parameters for the half cylinder mode in step 312.

In step 314, the controller 28 determines whether the deac__loop__ctr is less than 1. If it is, the controller 28 continues with step 318 where the controller calculates the following:

| |
|---|
| deac__loop__cntr = deac__loop__cntr +2/BL |
| Mass__Air__1__Back = $MAC_{k-2}$ + deac__loop__cntr*$MAC_{k-3}$ |
| Mass__Air__0__Back = $MAC_k$ + deac__loop__cntr*$MAC_{k-1}$ |

Where a variable BL is equal to 8 for an 8 cylinder engine. The calculation in step 318 is a simplified approximation of step 270 in FIG. 5C. In step 322, the controller 28 performs the Dynamic Air calculations and returns. If the deac__loop__ctr is not less than 1, the controller 28 calculates the following in step 326:

| |
|---|
| Mass__Air__1__Back = $MAC_{k-2}$+ $MAC_{k-3}$ |
| Mass__Air__0__Back = $MAC_k$ + $MAC_{k-1}$ |
| deac__loop__cntr =1 |

Control continues from step 326 to step 322.

If the controller 28 determines that the engine 10 is not operating in the half cylinder mode in step 306, control continues with step 330. In step 330, the controller 28 retrieves the appropriate TPS and MAP values from the history vector and sets parameters for the full cylinder mode. Control continues from step 330 to step 334.

In step 334, the controller 28 determines whether the deac__loop__ctr is greater than 0. If it is, the controller 28 continues with step 338 where the controller calculates the following:

| |
|---|
| deac__loop__cntr = deac__loop__cntr − 1/BL |
| Mass__Air__1__Back = $MAC_{k-1}$ + deac__loop__cntr*$MAC_{k-2}$ |
| Mass__Air__0__Back = $MAC_k$ + deac__loop__cntr*$MAC_{k-1}$ |

The calculation in step 338 is a simplified approximation of step 286 in FIG. 5C. In step 342, the controller 28 performs the Dynamic Air calculations and returns. If the deac__loop__ctr is not greater than 0, the controller 28 calculates the following in step 346:

| |
|---|
| Mass_Air_1_Back = $MAC_{k-1}$ |
| Mass_Air_0_Back = $MAC_k$ |
| deac_loop_cntr = 0 |

Control continues from step 346 to step 342.

As can be appreciated by skilled artisans, the method set forth in FIGS. 6A and 6B has reduced computational complexity in the four cylinder mode after the deac_loop_cntr is not less than 1. As a result, faster response times and reduced processor load may be realized. Likewise in eight cylinder mode, reduced computational complexity occurs when the deac_loop_cntr is not greater than 0.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control method for a displacement on demand engine, comprising:

providing a model for estimating cylinder air charge, wherein said model includes a history vector of inputs and states;

updating said history vector of inputs and states when a cylinder firing interrupt occurs;

determining an operating mode of said engine;

based on said operating mode, selecting model parameters and model inputs;

estimating said cylinder air charge; and wherein said operating mode of said engine includes partially displaced and fully displaced operating cylinder modes.

2. The control method of claim 1 wherein said air charge is calculated using at least one of cylinder inlet airflow and mass of air trapped in a cylinder.

3. The control method of claim 1 wherein said model is capable of predicting cylinder air charge for future cylinder firing interrupts, and further comprising predicting cylinder air charge for at least one future cylinder firing interrupt.

4. The control method of claim 3 wherein said model inputs for said half cylinder mode are taken over a crank angle period twice as long as said full cylinder mode.

5. The control method of claim 1 wherein said estimating step is preformed during said half cylinder mode only when an active cylinder firing interrupt occurs.

6. The control method of claim 1 wherein said cylinder firing interrupts for a revolution are equal to a maximum number of cylinders at said engine divided by two.

7. The control method of claim 1 wherein said model is an event-based model.

8. The control method of claim 1 further comprising blending between full and half mode model inputs for a first calibrated time when switching from said full mode to said half mode.

9. The control method of claim 1 further comprising blending between full and half mode model inputs for a second calibrated time when switching from said half mode to said full mode.

10. A control system for a displacement on demand engine, comprising:

a mass airflow meter located in an airflow inlet to said engine;

a fuel injector for metering fuel to said engine;

a controller coupled to said mass airflow meter and said fuel injector and including a processor and memory; and an air charge model that is executed by said controller and that estimates cylinder air charge, wherein said controller updates a history vector of inputs and states of said model when a cylinder firing interrupt occurs, wherein said controller selects model parameters and model inputs based on said operating mode of said engine and estimates said cylinder air charge; and wherein said operating mode of said engine includes half and full cylinder modes.

11. The control system of claim 10 wherein said air charge is calculated using at least one of cylinder inlet airflow and mass of air trapped in a cylinder.

12. The control system of claim 10 wherein said model is capable of predicting cylinder air charge for future cylinder fixing interrupts, and wherein said controller predicts cylinder air charge for at least one future cylinder firing interrupt.

13. The control system of claim 10 wherein said model inputs for said half cylinder mode are taken over a crank angle period twice as long as said full cylinder mode.

14. The control system of claim 10 wherein said estimating of said cylinder air charge and said predicting of said cylinder air charge for said future cylinder interrupts is performed during said half cylinder mode only when an active cylinder firing interrupt occurs.

15. The control system of claim 10 wherein said cylinder firing interrupts for a revolution are equal to a maximum number of cylinders of said engine divided by two.

16. The control system of claim 10 wherein said model is an event-based model.

17. The control system of claim 10 wherein when switching from said full mode to said half mode, said full and half mode model inputs are blended for a first calibrated time.

18. The control system of claim 10 wherein when switching front said half mode to said full mode, said full and half mode model inputs are blended for a second calibrated time.

19. An control method for a displacement on demand engine, comprising:

providing a model that is capable of predicting cylinder air charge for future cylinder firing interrupts, wherein said model includes a history vector of inputs and states;

updating said history vector inputs and states when a cylinder firing interrupt occurs;

determining an operating mode of said engine;

based on said operating mode, selecting model parameters and model inputs;

predicting said cylinder air charge for at least one future cylinder firing interrupt; and wherein said operating mode of said engine includes half and full cylinder modes.

20. The control method of claim 19 wherein said air charge is calculated using at least one of cylinder inlet airflow and mass of air trapped in a cylinder.

21. The control method of claim 19 wherein said model is capable of estimating cylinder air charge, and further comprising estimating cylinder air charge for said future cylinder firing interrupts.

22. The control method of claim 19 wherein said model inputs for said half cylinder mode are taken over a crank angle period twice as long as said full cylinder mode.

23. The control method of claim 19 wherein said estimating and predicting steps are performed during said half cylinder mode only when an active cylinder firing interrupt occurs.

24. The control method of claim 21 wherein said cylinder firing interrupts for a revolution are equal to a maximum number of cylinders of said engine divided by two.

25. The control method of claim 21 wherein said model is an event-based model.

26. The control method of claim 19 further comprising blending between full and half mode model inputs for a first calibrated time when switching from said full mode to said half mode.

27. The control method of claim 19 further comprising blending between full and half mode model inputs for a second calibrated time when switching from said half mode to said full mode.

28. A control system for a displacement on demand engine, comprising:

a mass airflow meter located in an airflow inlet to said engine;

a fuel injector for metering fuel to said engine;

a controller coupled to said mass airflow meter and said fuel injector and including a processor and memory; and an airflow model that is executed by said controller and that is capable of predicting cylinder air charge for future cylinder interrupts, wherein said controller updates a history vector of inputs and states of said model when a cylinder firing interrupt occurs, wherein said controller selects model parameters and model inputs based on said operating mode of said engine and predicts said cylinder air charge for said future cylinder firing interrupts; and wherein said model is capable of estimating cylinder air charge and wherein said controller estimates cylinder air charge for said future cylinder firing interrupts.

29. The control system of claim 28 wherein said air charge is calculated using at least one of cylinder inlet airflow and mass of air trapped in a cylinder.

30. The control system of claim 28 wherein said operating mode of said engine includes half and full cylinder modes.

31. The control system of claim 30 wherein said model inputs for said half cylinder mode are taken over a crank angle period twice as long as said full cylinder mode.

32. The control system of claim 30 wherein said estimating of said cylinder air charge and said predicting of said cylinder air charge for future cylinder interrupts is performed during said half cylinder mode only when an active cylinder firing interrupt occurs.

33. The control system of claim 28 wherein said cylinder firing interrupts for a revolution are equal to a maximum number of cylinders of said engine divided by two.

34. The control system of claim 28 wherein said model is an event-based model.

35. The control system of claim 30 wherein when switching from said full mode to said half mode, said full and half mode model inputs are blended for a first calibrated time.

36. The control system of claim 30 wherein when switching from said half mode to said full mode, said full and half mode model inputs are blended for a second calibrated time.

* * * * *